United States Patent [19]

Coury

[11] Patent Number: 4,881,406
[45] Date of Patent: * Nov. 21, 1989

[54] APPARATUS AND METHOD FOR TAKING MEASUREMENTS WHILE DRILLING

[76] Inventor: Glenn E. Coury, P. O. Box 666, Wheat Ridge, Colo. 80034

[*] Notice: The portion of the term of this patent subsequent to Aug. 23, 2005 has been disclaimed.

[21] Appl. No.: 235,112

[22] Filed: Aug. 22, 1988

Related U.S. Application Data

[63] Continuation-in-part of Ser. No. 25,192, Mar. 12, 1987, Pat. No. 4,765,183.

[51] Int. Cl.$^4$ .............................................. E21B 47/06
[52] U.S. Cl. ........................................ 73/154; 166/250
[58] Field of Search ................. 73/151, 154; 364/422; 175/40, 50; 166/250

[56] References Cited

U.S. PATENT DOCUMENTS 4,109,717  8/1978  Cooke, Jr. ............................. 73/154
4,765,183  8/1988  Coury .................................. 73/154

Primary Examiner—Stewart J. Levy
Assistant Examiner—Kevin D. O'Shea
Attorney, Agent, or Firm—Kyle W. Rost

[57] ABSTRACT

A first temperature sensor is carried by the drill pipe on a radially extensible arm for positioning the sensor at or near the face of the well bore for measuring the true temperature of the face. A second temperature sensor at an intermediate position on the arm measures the temperature of the drilling fluid near the location of the first sensor. The first sensor takes a plurality of readings over a predetermined period of time to detect changes in surface temperature. Both sensors transmit their measurements to a microprocessor, which employs the laws of multidimensional and transient heat transfer by conduction to calculate the true formation temperature.

20 Claims, 2 Drawing Sheets

APPARATUS AND METHOD FOR TAKING MEASUREMENTS WHILE DRILLING

CROSS REFERENCE TO RELATED APPLICATION

This application is a continuation-in-part of copending application Serial No. 025,192, filed March 12, 1987, now U.S. Pat. No. 4,765,183, issued Aug. 23, 1988.

BACKGROUND OF THE INVENTION

1. Field of the Invention generally relates to measurement and testing. More specifically, the invention relates to bore hole and drilling study, especially to formation logging by thermal study. The invention also generally relates to boring and penetrating the earth, and particularly to a bit and bit element structure. Another general aspect of the invention relates to electrical communications with acoustic wave systems and devices, especially those for well bore telemetering.

2. Description of the Prior Art of earth drilling, it is desired to know the temperature at the bottom of the well bore. Such measurement taking is difficult while drilling is in progress, because the drill bit and drill pipe are occupying the well bore. Measurements while drilling (MWD) have long been a goal, especially in the oil industry. MWD refers to the taking of measurements while the drill pipe is in the ground, at or near bottom hole, with the drill bit either turning or stationary. Without this capability, taking measurements at the bottom of a hole being drilled is complicated, time-consuming, and expensive. The typical method of attempting to measure formation temperature is to stop drilling, pull the entire drill string from the hole, lower a wireline instrument into the bore hole, and take the required measurements. Subsequently, the measuring device is removed from the hole, and the drill string is dropped back in place.

Other methods and equipment are known that attempt to take the measurement while drilling continues or at least without requiring removal of the drill stem. For example, U.S. Pat. No. 3,455,158 to Richter, Jr. et al, employs a transducer or thermocouple located in the drill bit. Due to the location of the thermocouple, the resulting measurement would be indicative of the temperature of the bit, the drilling fluid, and the formation. However, a formation temperature would not be readily evident, since the bit warms by friction and the circulating drilling fluid carries heat through the well bore. Another system is taught in U.S. Pat. No. 4,561,300 to O'Brien, which discloses a capsule-like temperature recorder that contains alloys of various melting temperatures. The capsules circulate with drilling fluid and are recovered for inspection at the wellhead. This system will show the highest temperature encountered by a capsule, but it would be unknown where in the well bore the capsule encountered the temperature. In addition, the temperature would likely be that of the surrounding drilling fluid and not the true formation temperature. A further system is taught in U.S. Pat. No. 3,701,388 to Warren, which discloses a method of drilling in which mud temperature is continuously measured at the wellhead by an in-line sensor. This temperature would be related only loosely to the formation temperature deep in the well bore.

The state of the art also is shown by patents relating to measurements taken after drilling is complete. For example, U.S. Pat. No. 3,363,457 to Ruehle discloses an infra-red detector that is lowered into the borehole after the drill string is removed. Thus, the detector takes the measurements after drilling is complete and after the well bore has had a considerable opportunity to stabilize its local formation temperatures. Further, U.S. Pat. No. 2,843,459 to Meiklejohn discloses a different type of tool that is used after drilling is complete. This tool ejects a chemical against the wall of a well bore, and the tool then employs temperature sensors to detect any resulting temperature increase within the well bore. The purpose and function of this tool is limited to detecting the heat of any resulting chemical reaction with the material of the bore wall and not to measure true formation temperature.

The state of the art is further demonstrated by a paper by Vagelatos, Steinman, and John, 'True Formation Temperature Sonde (TFTS),' presented at the SPWLA Twentieth Annual Logging Symposium, June 3-6, 1979. This paper describes the importance of knowing the true formation temperature and describes a wire-line instrument that purports to measure this temperature by neutron gauging, wherein fast neutrons are directed into the formation and returning slow neutrons are detected. The method purports to penetrate the formation wall to a depth of 6 to 12 inches. This instrument would be used after the drill bit has been removed from the well bore. Although the method does not purport to enable measurement while drilling (MWD), it demonstrates the direction of the art.

Various patents have proposed telemetry systems for transmitting data from the well bore to the surface and are incorporated by reference for this teaching. U.S. Pat. No. 4,578,675 to MacLeod teaches a telemetry system that employs electrical current transmissions through the drill string to characterize formations. U.S. Pat. No. 4,393,485 to Redden discloses a post-completion monitoring system for tracking production information in a well. Temperature and pressure sensors are placed downhole in a producing well and are monitored by computer. Another system is disclosed in U.S. Pat. No. 4,520,468 to Scherbatskoy, in which a pulsar transmits data through the drilling fluid via pressure pulses.

Well temperature measurements are desired as a means of determining formation properties. Obtaining an accurate measurement of a downhole formation temperature is difficult not only because of physical difficulty and expense, but also because of technical problems, particularly when the desired measurement is the true formation temperature at any depth. The expression, 'true formation temperature,' refers to the rock temperature that existed at any depth before drilling began. One of the technical problems is that the act of drilling, itself, changes rock temperature in the vacinity of the well. The friction and cutting action of the drill bit adds energy to the rock, thereby increasing its temperature. Thus, at the moment when a formation is exposed for possible temperature measurement, the exposed area has a substantially altered temperature.

A further problem is that the action of the drilling mud significantly reduces the rock temperature in most situations. Drilling mud is injected in the well through the drill pipe, and it returns to the surface through the annular space between the outside of the drill pipe and the wall of the hole being drilled. The drilling mud may have several functions including lubrication, lifting the drilling debris out of the well, and cooling the system. Even if cooling is not the goal, it will occur. The rock wall itself will be cooled, and it will approach the temperature of the drilling mud. Because of the cool wall, the interior of the rock also will be cooled, as heat is conducted from the rock formation toward the cooled wall.

This cooling effect will extend into the rock for a certain distance from the face of the well bore. However, there will be some distance from the face of the well bore at which the temperature of the rock will remain at the true reservoir temperature. Several factors influence the size of this distance, including: the length of time the well bore surface has been exposed to the drilling mud; the heat transfer coefficient between the well bore and the mud, which depends on such factors as the degree of turbulence in the flowing mud and the properties of the mud; the physical properties of the rocks, such as density, heat capacity and thermal conductivity; and the characteristics and uniformity of the rock matrix as is related to such factors as its porosity and permeability and whether the pores are filled with water, oil or other material. Thus, the temperature actually measured by conventional equipment is altered from the true temperature of the earth as it existed before the drill bit penetrated the formation.

The problem of measuring true reservoir temperature is that, if a temperature sensor is placed within a well bore, either while drilling is in progress or while it is stopped, the sensor will measure the temperature of the mud and not that of the rock formation. Even if the sensor is placed against the surface of the rock wall of the well bore, it will measure the wall temperature and not the true formation temperature.

The art has not developed an apparatus or method that enables the true reservoir temperature to be determined, especially when drilling is in progress or is momentarily stopped. As drilling time is expensive, it would be important and significant to be able to determine true formation temperature accurately, rapidly, and without substantial interruption of drilling operations. Since rotation of the drill string must be stopped periodically to add additional drill pipe, it would be desirable to have a device that could take an accurate temperature measurement at the bottom of the well bore in no more than the time necessary to add such pipe. Of course, it would be equally as beneficial to take the measurement while the drill string is rotating. Either of such techniques could be termed 'measurement while drilling.'

To achieve the foregoing and other objects and in accordance with the purpose of the present invention, as embodied and broadly described herein, the apparatus and method of this invention may comprise the following.

SUMMARY OF THE INVENTION

Against the described background, it is therefore a general object of the invention to provide an improved apparatus and method for measuring temperature, wherein the equipment can be mounted on a drill collar for use either during drilling or during pauses in drilling, while the drill stem is in place. With such equipment, temperature measurement may be taken soon after a fresh section of well bore wall has been exposed.

Another object is to provide a process and equipment of the noted type, wherein a rapidly acting temperature sensor is operated to measure changes in temperature of the well bore surface over time. A preferred apparatus carries a sensor on an extendible arm, such that the sensor can be applied to the well bore wall during measurements.

A further object is to submit data as collected by a temperature sensor to a signal treatment center, such as a microprocessor located either downhole, on the drill collar, or at the wellhead. The submitted data is applied in combination with differential and algebraic heat transfer equations to deduce original, pre-drilling formation temperature.

The principal object of the invention is to provide method and apparatus for determining the true formation temperature and other reservoir properties, as opposed to measurements of the mud temperature or the temperature of the wall of the well.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an apparatus for determining true formation temperature of an earth formation at the face of a well bore provides a first temperature sensor that measures the temperature of the face of the well bore. A support carries the first temperature sensor at a preselected depth in the well bore, substantially at the depth of the earth formation to be measured. A locating means positions the first temperature sensor laterally of the support at a proper position with respect to the bore wall for taking a temperature measurement of the face of the bore wall. A second temperature sensor measures the ambient temperature within the well bore near the location of the first temperature sensor. An activating means causes the first temperature sensor to register temperature readings of the face of the well bore over a predetermined period of elapsed time. The readings of the first and second temperature sensors are transmitted to a processing means, which receives the temperature readings of the well bore face and of the ambient temperature from the first and second temperature sensors and calculates from them the true formation temperature by the laws of multidimensional and transient heat transfer by conduction.

According to a further aspect of the invention, a method is provided for measuring the true formation temperature of an earth formation bordering a well bore. The method includes the steps of providing a support for carrying a first temperature sensor, and positioning the support at a predetermined depth in a well bore. A locating means is provided for laterally positioning the first temperature sensor with respect to the support, and when the locating means is actuated, it laterally moves the first temperature sensor to a suitable position for taking a temperature measurement of the face of the formation at the wall of the well bore. The first sensor senses the temperature of the face of the formation by a plurality of temperature measurements spaced over time. These measurements are transmitted to a processing means, which uses them to calculate the true formation temperature by mathematically processing them by the laws of multidimensional and transient heat transfer by conduction.

The accompanying drawings, which are incorporated in and form a part of the specification illustrate preferred embodiments of the present invention, and together with the description, serve to explain the principles of the invention. In the drawings:

DESCRIPTION OF THE PREFERRED EMBODIMENTS

Figure 1:
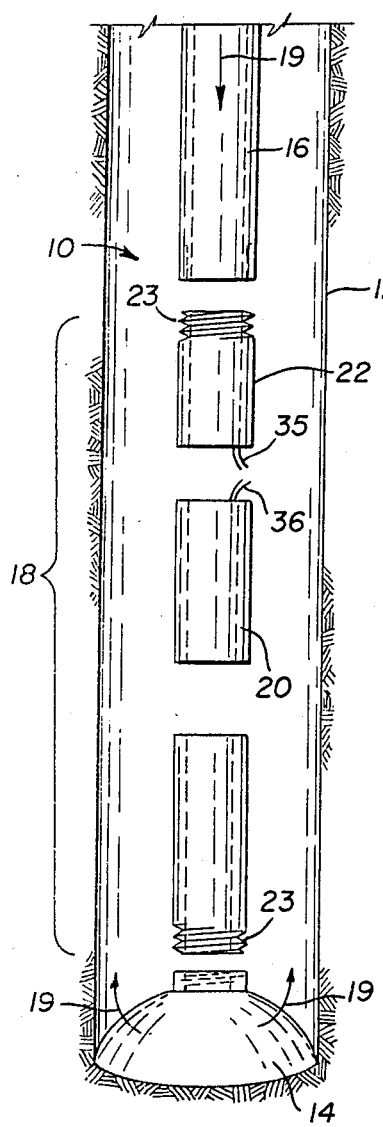
FIG. 1 is a schematic view showing the invention installed in a drilling system, with the bore hole in vertical cross-section.

The invention is applied to a well bore 10, as illustrated in FIG. 1. For example, the well bore may be that of an oil well, gas well, geothermal well, water well, or other bore seeking hard minerals such as coal. The longitudinal dimension of the bore may be vertical or any other direction, although for convenience the bore will be considered to be vertical. This typical bore has an interior, generally cylindrical face 12 that extends from the wellhead to the terminal end of the bore, which in a substantially vertical hole would be the bottom. While the bore is being drilled, a drill bit 14 is located within the bore, operating at the terminal end. The drill bit is operatively connected to a string of drill pipe 16 that extends the full length of the well from the surface, where the pipe is attached to a prime mover that turns the pipe to rotate the bit.

According to the invention, a collar assembly 18 is mounted in-line with the drill string at a position above the drill bit 14 and below at least parts of the drill pipe 16. The collar is pipe-like in its construction, and has a hollow center that communicates with the hollow center of the drill pipe and the hollow center of the bit. A drilling fluid such as drilling mud 19 from the surface passes through the interior of the drill pipe and the collar assembly 18, then at the bit passes out into the bore hole and returns to the surface through the annular space between the face of the well bore and the drill pipe. The direction of flow of the drilling fluid could equally well be reversed without altering the invention.

The collar assembly 18 consists of several components and may include one or more individual collar sections, which permit the assembly 18 to be mounted in the drill string either in a single, continuous line or at longitudinally separated positions along the drill string. The two primary components of the collar assembly are the telemetry means subsystem 20 and the measurement means subsystem 22. The telemetry means subsystem is for transmitting a signal to the surface of the ground, and, similarly, receiving signals from the surface for instructing the measurement means subsystem. Various types of telemetry systems are known, such as those referred to above. Thus, the telemetry means subsystem 20 may be a conventional, commercially produced apparatus, such as a system that communicates by electrical signal. The measurement means subsystem 22 may be connected to the same or a different section of the collar assembly. A sensing element and a means for communicating with the telemetry means subsystem are included. Each end of the collar assembly 18 includes an attachment means such as a threaded end 23 for joining the section to the conventional members of the drill string. For example, all sections of the collar assembly may be attached as a single unit having its upper end joined to a section of drill pipe and may be attached at its lower end to the drill bit. It may be preferred to mount the measurement subsystem elsewhere along the drill pipe, although usually it would be preferable to place it near the drill bit so that the reservoir properties near the bottom of the hole can be measured.

Figure 2:
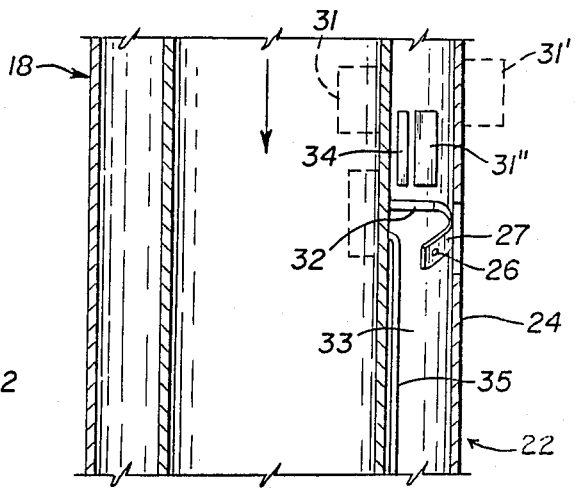
FIG. 2 is a schematic detail view of figure 1, showing the measurement subsystem in vertical cross-section.
Figure 3:
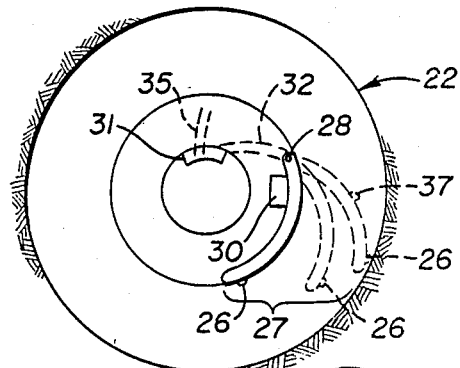
FIG. 3 is a schematic detail view of figure 1, showing the temperature sensor element and its mounting in horizontal cross-section.
Figure 4:
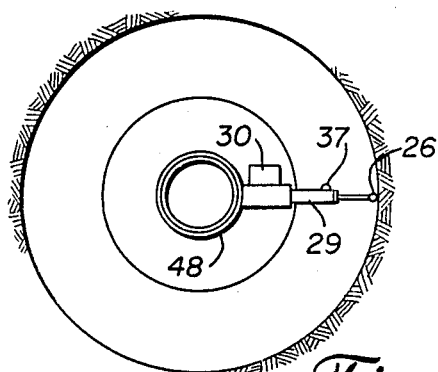
FIG. 4 is a view similar to FIG. 3, showing another embodiment of various components.

The measurement means subsystem 22, FIGS. 2 and 3, may carry its component parts on wall 24 of the cylindrical collar section 18. The subsystem includes at least a first sensing element 26 that is attached to the collar section wall 24 by an arm means 27 for laterally extending and retracting the sensing element from the wall 24 to the surface of the well bore. The arm means 27 may be a rigid member as shown in FIG. 3, attached to the collar wall by a hinge 28, which permits the arm to pivot outwardly toward the wall of the well bore. Such an arm 27 may have a shape similar to a caliper tool and be spring loaded to hold the sensing element at the desired extended position. Alternatively, the arm means may include a telescoping series of tubes 29, FIG. 4, that performs the equivalent function, moving the sensing element 26 radially within the bore. Depending upon the requirements of the temperature sensor element, the arm means may permit the sensing element to approach or reach the wall. When full extension is desired, the arm is sufficiently long with respect to the size of the drill bit to cause the first sensing element to come into solid contact with the wall of the well bore.

An actuating means such as an electrically controlled motor 30 is operatively connected to the arm to extend or retract it according to direction of motor operation. The motor may be activated via the telemetry subsystem so as to be selectively operated. Further, the sensing element 26 on the arm means may be selectively activated via the telemetry subsystem so that readings can be taken at any desired frequency of time and any position of arm extension. The temperature measurement system may be set into operation when the rotary action of the drill pipe ceases, for example, when activation is controlled by a centrifugal switch associated with motor 30. Alternately, the temperature measurement system may be set into operation by a small upward movement of the drill pipe, such as occurs when a new section of drill pipe is being added at the surface. Activation also may occur when a signal is sent from the surface via the telemetry subsystem.

A processing means in the form of a signal treatment center 31 is connected to the sensor by a suitable transmitting means, such as by wires 32. This center, which is composed of a microprocessor, may be carried by the collar wall 24 in any of several positions. FIG. 2 shows the signal treatment center to be either inside wall 24 at location 31, outside wall 24 at location 31', or within wall 24 at location 31" in a cavity. Collar 18 may provide a double-walled, annular chamber 33, sealed to prevent entry of drilling fluid, within which the signal treatment center is installed. If insulation is required, dewar-type heat insulators 34 are included in the chamber 33. The connecting wires 32 extend from the sensor, passing through the body of the arm means 27, within which the wires are embedded, and through the hinge assembly or retractable arms. Then, the wires extend within the collar wall 24 to the signal treatment center. Further wires 35 connect the signal treatment center to the telemetry means subsystem and provide a means of transmitting the treated signals. These wires are embedded in the collar wall 24 of the measurement means subsystem. Wires 35 then are attached to connector wires 36, FIG. 1, that tie into the telemetry means subsystem.

The primary sensing element 26 is designed to measure the temperature of the rock wall surface and rapidly to measure changes in this temperature as they occur over time. In addition, other temperature, pressure, or flow sensors can be placed along the retractable arm, or on the inside or outside walls of the measurement means subsystem to provide additional data about the drilling mud conditions. At least one additional, second temperature sensing element 37 is located in the area of mud flow, such as on the center portion of arm means 27, for determining the mud temperature. For the purpose of temperature measurements, surface thermocouples provide one example of the type of sensor that can be used. This type of thermocouple is known in the art.

Figure 5:
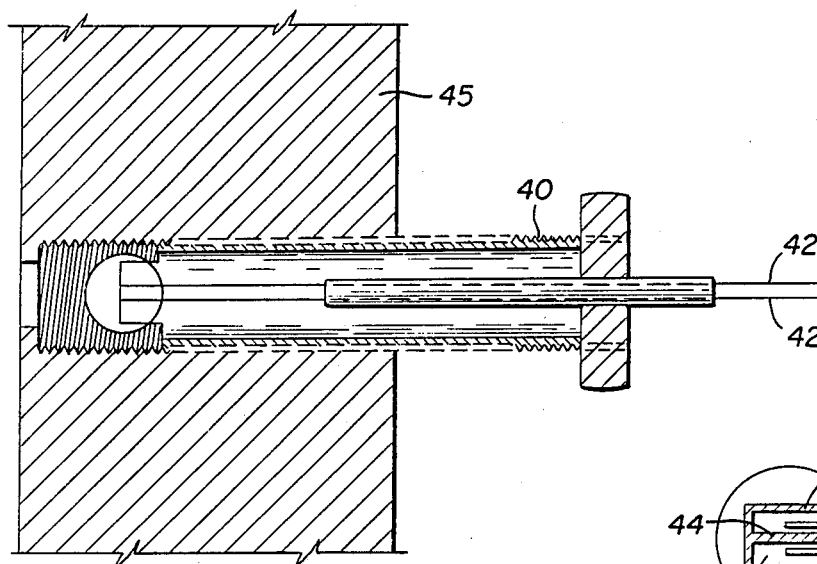
FIG. 5 is a schematic cross-sectional view of a surface thermocouple and its installation so that it measures surface temperature.
Figure 5A:
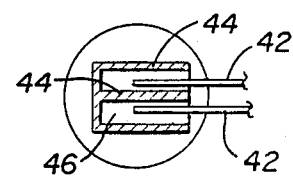
FIG. 5A is a detail view of FIG. 5, showing the thermocouple tip.

One variety of surface thermocouple 40, FIGS. 5 and 5A, employs two very fine thermocouple wires 42 that are insulated from each other and are brought through the thermocouple body to end flush at the measuring surface of the unit. A preferred thermocouple employs wires that are rectangular in cross-section with a thickness of about 25 microns. A mica insulator 44 having a thickness of about 5 microns separates and laterally surrounds the wires. The thermocouple body 40 through which the wires pass is a metal screw, which is installed in a metal block 45. Because of the very small sizes of the wires and insulator, they introduce essentially no distortion to the normal temperature field in the metal block, which quickly would approach the temperature of the surrounding drilling fluid. A junction 46 between the wires is created by rubbing emery paper across the surface, causing slivers of metal to be wrought out by the paper and welded across the mica insulator onto the exposed edges of the thermocouple wires. Another technique for forming the junction is vacuum deposition of a metallic coating across the face of the thermocouple. A thin coating, for example in the range of one or two microns, of chromium or rhodium would provide a fast response time to temperature changes.

In operation, the system may operate the arm 27 and sensor 26 in any of several ways. First, it may maintain the retractable arm in extended position, so that the sensor element always is in contact with or near the wall of the well bore. In this usage, the arm and sensing elements may rotate with the drill bit. Alternatively in this same usage, the collar assembly may be formed as a sleeve that is mounted on bearings 48, FIG. 4, to permit the drill string and bit to rotate with respect to the sleeve. The latter arrangement allows the arm and sensor to be non-rotating with respect to the well bore wall, although the arm and sensor continue to move longitudinally in the bore with the bit. In either case, it would be possible for the sensor to measure the temperature of the well bore wall on a substantially continuous basis, transmitting the measurements to the signal treatment center on a continuous, real time basis. The signal treatment center would include a clock to determine the time line over which temperature readings are taken.

The second and preferred method of operation is to have the arm in retracted or closed position until a measurement is to be made. The most appropriate time for making the measurement usually will be the pause in drilling when a new section of pipe is being added to the drill string. Thus, for example, when rotation of the drill bit is stopped, a manual or an automatic signal can be sent to the measurement subassembly. This signal will activate the actuating means 30 until the sensor is in its desired position. When or before rotation begins again, another signal is given to the actuating means 30 to cause the arm to be retracted to the closed position. As noted above, a centrifugal switch may initiate extension of the arm automatically when drilling stops. Such measurements are made with the rig stationary but with drilling fluid still circulating, for a time period that ranges from about 5 to 200 seconds. In a typical case, the readings would be completed within thirty seconds. Then, the drill pipe is raised to add another section of drill stem, and drilling is recommenced. The measurements may be made after the pipe is raised, while the new pipe section is being added at the wellhead. In this way, the drilling is not delayed. The centrifugal switch of motor 30 then causes the arm to retract. This procedure may be repeated every time the drilling has reached the end of the new section of drill stem or at intermediate depths.

Figure 6:
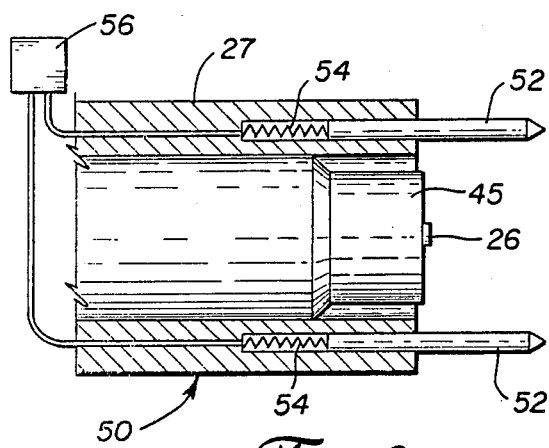
FIG. 6 is a schematic side view of a sensor element and arm in side cross-section, showing a position sensing means.
Figure 6A:
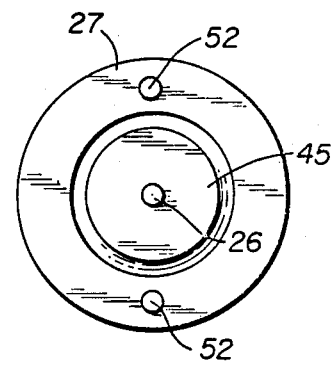
FIG. 6A is a front end view of the arm of FIG. 6.

A means for ensuring that the primary sensing element 26 is in good contact with the bore wall is provided by either a mechanical apparatus or a calculated method. The mechanical apparatus 50, figure 6, places the head 26 of the temperature sensor in a protruding position with respect to the arm 27. One or more and preferably three position sensor probes 52 are carried by the arm and extend outwardly beyond the primary sensor head 26 by a predetermined maximum distance. When more than one position sensor is employed, they are spaced around the head of the temperature sensor. Each position sensor may be a cylinder having a tapered outer end. An outwardly spring loaded mounting 54 attaches each sensor to the arm and urges the sensor to move outwardly to a predetermined limit of travel. The degree of each position sensor's extension or deflection is measured by a detection means 56, such as a resistive or capacitive circuit, or by a strain gauge that measures deflection of the spring. As the primary temperature sensing element is extended toward the bore wall, the position sensors first contact the wall and initially are pressed into the arm against the spring. The degree of compression is detected and transmitted to the signal treatment center, where the compression data is analyzed to determine the position of the primary sensing element 26 with respect to the bore wall. If it is determined that the sensing element is not in good contact, the arm 27 can be retracted and redeployed, or the drill pipe can be rotated or moved longitudinally in the bore until the sensing element is determined to have good contact with the bore wall.

The calculated method involves the steps of extending the arm 27 toward the bore wall while taking a series of temperature measurements as the arm is approaching the wall. The measurements are transmitted to the signal treatment center and analyzed in two parts. First, the change in temperature over the time required for the sensing element to reach the wall is considered. Second, the temperature at the primary sensing element is compared to the temperature at the secondary sensing element. If the temperature at the primary sensing element remains the same over time or is the same as that of the drilling fluid, then it may be concluded that the primary sensing element has not yet reached the bore wall. Thus, further extension is attempted until the condition changes, or the primary sensing element 26 may be redeployed or repositioned by moving the drill pipe.

The temperature sensor 26 measures temperature over a time period. The signal from the sensor is sent to the signal treatment center 31, where it is processed in various ways. As one example, the treatment center may be a heat meter, which is a specialized analog computer. The operation of a heat meter is premised upon the similarity between the differential equations that describe conductive heat flow and the equations that describe the flow of electric current in a capacitive circuit. A circuit made up of properly sized resistors in series and capacitors in parallel is built to simulate the heat transfer through the rock. This circuit is contained within the signal processing cavity of the measurement subsystem. The input signal to this circuit is the electrical output from the temperature sensor. The magnitude of the input signal will change with time as the temperature of the well bore face changes with time. The changing signal causes changes in the voltages and currents at various points in the heat meter. Measuring the voltage across the appropriate resistor and capacitor elements gives a value that is proportional to the true reservoir temperature. This result is sent to the telemetry subsystem for transmission to the surface.

Another example of a signal treatment center is a microprocessor or computer that is used to receive the temperature signal over time and to use the received data to solve a set of simultaneous algebraic equations. The solutions to these equations are values of the parameters that are sought: the true reservoir temperature and other reservoir properties. The microprocessor sends out a signal equivalent to these values to the telemetry subsystem, which transmits the signal to the surface. Alternately, the temperature signals themselves can be sent to the telemetry subsystem and transmitted to the surface, in which case the microprocessor or computer can be located at the surface.

The mathematical treatment of the temperature and time data employs the general laws of multidimensional and transient heat transfer by conduction. It takes into account that the temperature of the rock will be approximately uniform at any given depth before drilling is initiated. The act of drilling will cool or heat the rock in the vicinity of the drill bore, depending, for example, whether the cooling effect of the drilling mud exceeds the frictional heating effect of the drill bit. The face or wall of the drill bore will be at an intermediate temperature, between the temperature of the drilling mud and the original rock temperature at the relevant depth. In addition, the temperature of the bore hole face will be changing with time. The original rock temperature, which is the true reservoir temperature at the given depth, will be affected only in the vacinity of the well bore. The thickness of the affected zone depends on the properties of the reservoir rock and of the drilling mud, among other factors. In addition, the thickness of the affected zone will change with time.

For example, in the case where the rock is cooled by the drilling mud, the wall of the well bore initially is at the constant temperature ($T_0$), which is the true formation temperature. The temperature is constant everywhere in the rock at the relevant depth until the moment, at zero time, when the effects of drilling are felt by the formation. At a later time, the well bore temperature has fallen due to cooling by the mud, and the cooling effect is transferred by heat conduction for a short distance into the rock. Over this distance, the temperatures are less than the true reservoir temperature. Two facts are clear from these events:

(1) The well bore face temperature falls to or near the drilling mud temperature. As time increases, the interior temperature within the affected zone comes increasingly closer to the mud temperature but does not fall below it.

(2) The thickness of the affected zone gets larger as time passes.

The rate of cooling of the well bore face and the thickness of the affected zone are governed by the partial differential equation:

$$\frac{\delta T}{\delta t} = \frac{a}{r} \frac{\delta T}{\delta r} + a \frac{\delta^2 T}{\delta r^2} \quad (1)$$

with boundary conditions:

$$t = 0: T = T_0 \text{ for all } r \quad (2a)$$

$$r \rightarrow \infty: T \rightarrow T_0 \text{ for all } t \quad (2b)$$

$$r = R: q = q_d \text{ for } 0 < t \leq t_d \quad (2c)$$

$$q = q_f \text{ for } t > t_d \quad (2d)$$

where equation (1) is based on the radial coordinate system centered along the axis of the bore hole, and the equation covers the case in which changes along the vertical and angular directions are small or nonexistent. Thus, equation (1) represents the change in temperature (T) as a function of time (t) and distance from the centerline (r) of the well, where (R) is the radius of the well bore; ($T_0$) is the true reservoir temperature; and (a), the thermal diffusivity of the reservoir rock and its occluded liquid are values that are to be found by means of the measurement subsystem; (q) is the heat flux into or out of the rock that is caused by the drilling process; and the subscripts on the heat flux term are defined such that ($q_d$) is the heat flux during the time interval that the drill bit is operating until time ($t_d$), and ($q_f$) is the heat flux for all times greater than ($t_d$). As implied by boundary condition (2d), the timing is started at the moment that the drill bit reaches the depth in question. The heat flux due to heat transfer between the drilling mud and the rock wall, ($q_f$), can be expressed in terms of the heat transfer coefficient (h) as follows:

$$q_f = h(T_S - T_F) \quad (3a)$$

where ($T_S$) and ($T_F$) are the temperature of the wellbore face rock and of the drilling mud, respectively. This heat flux is exactly equal to the rate of heat flow in the rock at the surface by the process of conduction, expressed as:

$$q_f = -k(\delta T/\delta r)_{r=R} \quad (3b)$$

where (k) is the thermal conductivity of the reservoir rock. Thus, the boundary condition of equation (2d) is completed by the condition that ($q_f$), as calculated by equation (3a), equals ($q_f$) as calculated by equation (3b).

If (a), $(T_0)$, $(q_d)$, $(q_f)$, and $(t_d)$ are known, equation 1 can be solved, and the solution will be an equation that gives the temperature (T) at every moment in time (t) and at every distance from the well bore axis (r) when $(r) \geq (R)$. This result also can be accomplished if a more complex equation, also containing terms to represent temperature changes in vertical and angular directions, is used in place of equation (1).

However, as indicated, the variables (a), $(T_0)$, $(q_d)$ and $(q_f)$ are not known and, specifically (a) and $(T_0)$ are to be found by use of the present method and apparatus. The temperature sensing element 26 on arm means 27 measures the value of $(T_R)$, the temperature of the face of the well bore, which is at the distance (R) from the center of the well bore. The value of $(T_R)$ will change with time. Therefore, it is important that the sensing element respond quickly to changes in the well bore temperature to give a close representation of the value of $(T_R)$ as a function of (t). Similarly, it is important that the temperature sensor measure the value of $(T_R)$ and not the value of the drilling mud temperature.

When $(T_R)$ is known as a function of time, based on the utilization of this invention, the signal can be evaluated to deduce the values of (a) and $(T_0)$. That is, the reservoir properties (a, the thermal diffusivity and $T_0$, the true reservoir temperature) can be calculated based on these measurements.

In order to determine the true reservoir temperature and other reservoir properties, certain measurements must be made at various times, and calculations must be made based on these measurements, wherein the measurements and calculations are consistent with solutions to equation (1). In essence, the measurements simply map the solution to equation (1) at the same time that the rock reservoir is undergoing the solution, i.e., while the temperature within the rock is changing according to equation (1). Then, the calculations are used to deduce, on the basis of the changing temperatures, what the initial conditions were, as expressed by equation (2b), which is the true reservoir temperature. Stated differently, measurements of the system's changes are used to determine the initial conditions of the mathematical equations. This is the inverse of the process in which the equations are solved, using initial conditions, to predict the changes.

For purposes of illustration, the calculational process is demonstrated by means of a heat transfer situation similar to that represented by equation (1), but that is somewhat simpler to express algebraically. The system represented by equation (4), below, is for a rectangular coordinate system instead of a radial coordinate system. In practice, the rectangular system is applicable with sufficient accuracy when physical properties and the elapsed time are such that temperature changes in the circumferential direction are negligibly small relative to temperature changes in the radial direction.

The equation to be solved is:

$$\frac{\delta T}{\delta t} = a \frac{\delta^2 T}{\delta x^2} \quad (4)$$

and the associated boundary conditions are:

$$T = T_0 \text{ for all } x \quad (5a)$$

$$x \to \infty: T \to T_0 \text{ for all } t \quad (5b)$$

$$x = 0: q_0 = -k(\delta T/\delta x)_{x=0} \quad (5c)$$

The variables used above and in the solution are defined as follows:

k: Thermal conductivity of the reservoir-rock system.

$q_0$: Heat flow between the drilling mud and the well bore wall, assumed constant over the time interval in question; also, equals the rate of heat conduction from the well bore wall into the reservoir rock.

t: Time, as measured from the moment the rock system temperature begins to change as a result of the drilling.

$t_1$: The time elapsed until the moment that measurements of the well bore wall begin.

t': The time elapsed after measurements of the well bore wall were begun (i.e., $t = t_1 + t'$).

$t_1'$, $t_2'$, $t_3'$: Three values of t' at which specific measurements are made (see $T_{S1}$, $T_{S2}$, $T_{S3}$).

T: Temperature of the reservoir rock, which may change as a function of time (t) and position (x).

$T_0$: Temperature of the reservoir rock at time zero (t=0); that is, the true reservoir temperature.

$T_S$: Temperature of the surface, or the wall of the well bore rock, which may change with time.

$T_{S1}$, $T_{S2}$, $T_{S3}$: Three values of $T_S$, as measured at times $t_1'$, $t_2'$ and $t_3'$, respectively.

x: Distance measured into the rock wall, where x = 0 at the surface of the rock wall.

$\rho$: The density of the reservoir rock system.

$c_p$: The specific heat of the reservoir rock system.

a: The thermal diffusivity of the reservoir rock system, equal to $k/\rho c_p$.

B: A convenient grouping of variables, equal to $$2\sqrt{a}/k.$$

The solution to equation (4) can be found by known mathematical techniques, together with measurement of:

$T_{S1}$ at time $t = t_1 + t_1'$ $T_{S2}$ at time $t = t_1 + t_2'$ $T_{S3}$ at time $t = t_1 + t_3'$ where $(t_1)$ is unknown and $t_1' = 0$, by definition. The value of $(T_0)$ can be defined in terms only of measured values as:

$$T_0 = \frac{t_2'(T_{S3}^2 - T_{S1}^2) - t_3'(T_{S2}^2 - T_{S1}^2)}{2[t_2'(T_{S3} - T_{S1}) - t_3'(T_{S2} - T_{S1})]} \quad (6)$$

The value of (B), which is a valuable indicator of other reservoir rock properties, can be derived by the formula:

$$B^2 = \frac{4a}{k^2} = \frac{-1}{q_0^2} \frac{(T_0 - T_{S1})^2 - (T_0 - T_{S2})^2}{t_2'} \quad (7)$$

Finally, the value of $(t_1)$ can be derived as:

$$t_1 = \frac{t_2'}{1 - [(T_0 - T_{S2})/(T_0 - T_{S1})]^2} \quad (8)$$

Thus, equation (8) gives the time elapsed since the temperature change began, based only on known, measured values, plus the known value of $(T_0)$ as calculated by equation (6). Equation (7) expresses (B) as a function of known values ($T_{S1}$, $T_{S2}$, and $t_2'$), which are measured; and ($T_0$) which is calculated by equation (6) and of the unknown, but constant value of ($q_0$), which is considered to be essentially constant over the short time period of the measurements. In order to calculate (B) from equation (7), the value of ($q_0$) must be known. To find ($q_0$) with reasonable accuracy, equation (3a) is used. For equation (3a), ($T_S$) is a value measured at several moments as indicated above. ($T_f$) is measured by an independent sensor 37 on the retractable arm, as the temperature of the drilling fluid. The film heat transfer coefficient (h) is calculated by standard equations and correlations, based on the dimensions of the bore hole, the properties of the drilling mud, and the flow rate of the drilling mud.

The apparatus and the method of its operation is most notable for the improved measurement capability that it offers during active drilling operations. However, the apparatus and method remain useful in other situations as well. For example, they may be employed after drilling, on a wire line, or during production. The advantage of obtaining a rapid indication of true formation temperature would remain in these other situations. Thus, the invention is especially wall adapted for MWD but is suitable for taking measurements under other conditions as well.

The apparatus may employ either one or two temperature sensing means. The first temperature sensor 26 provides values of $T_{S1}$, $T_{S2}$, and $T_{S3}$ in equation (6). This allows the value of $T_0$ to be calculated, where $T_0$ is the desired value of the true reservoir temperature.

The second temperature sensing means 37 measures the temperature of the drilling mud, which is the value of $T_F$ in equation (3a). For this same equation, $T_S$ is the temperature of the well bore wall, which also is the measure values represented by $T_{S1}$, $T_{S2}$, and $T_{S3}$ in equation (6). The term (h) in equation (3a) can be calculated in accordance with the principles of heat flow, as discussed above. Thus, the knowledge of $T_F$ gained by the second temperature sensing means, together with the values provided by the first temperature sensing means and the calculated value of (h) allows the following chain of calculations to be made:

(a) first, the value of ($q_f$) from equation (3a) is found, as ($q_f$) is the same physical quantity called ($q_0$) in equation (7).

(b) then with ($q_f$) or ($q_0$) known, and with ($T_0$) calculated by equation (6), the value of (B) can be calculated from equation (7), as discussed above.

The previously presented data analysis steps relate to a simplified case of pure conduction, unaccompanied by an exchange of fluid between the well bore and the formation. This situation of no cross flow, or of essentially no cross flow, will be the normal case over much of the well bore in which the drill passes through impermeable or essentially impermeable rock. Under these circumstances, the mathematical description as provided above is completely applicable.

However, when the drill bit passes through a permeable zone, the potential arises for such cross flow to occur. If, within the permeable zone the well bore pressure is greater than the formation pressure, drilling fluid will enter the formation. If the well bore is at a lower pressure than the permeable formation, and if the formation contains producible fluids, there will be flow into the well bore from the formation.

Knowing where such cross flow occurs is of great value to the drilling crew charged with the safe and efficient completion of the drilling operation. This knowledge also is important to the staff evaluating the technical aspects of the operation, since the existence of a cross-flow provides some evidence of the nature of the formations being traversed.

This data can be provided by the apparatus and method of the invention, both as qualitative and quantitative information. The following examples describe in a general way how the invention may be used in a variety of situations.

Example 1

Gas kick is the cross flow of fliud in which gas leaves the formation and enters the well bore. The exodus of gas from the formation distorts the temperature distribution within the formation. Generally, there are two counteracting heat flows, and, for purposes of example, the drilling mud will be presumed to be cooler than the well bore, while the gas will be presumed to be warmer. First, the drilling mud provides a conductive heat flow as cooler drilling fluid passes over the well bore wall, which tends to have a cooling effect on the rock wall. Second, gas from deeper in the formation will flow to the well and provides a convective heat flow due to hot gas leaving the formation, which tends to add heat to the rock near the well bore. The relative size of these two counteracting heat flows will determine the actual temperatures within the formation.

In order to detect the gas kick, the arm 27 is operated by partically extending the arm for rotation with the drill pipe, such that the sensor 26 is near the wall of the well bore. The mechanical apparatus 50 of FIG. 6 may be used to determine when the sensor is near, but not touching, the bore wall. For example, the probes 52 may contact the bore wall with only partial compression. The detection means 56 will detect that the probes are only partially compressed, informing the operator both that the probe is near the wall and that the probe is not firmly against the wall. When hot gas crosses the sensor 26, the temperature anomaly will be noticed as a relatively sudden increase in temperature. The size of the gas kick can be estimated on the basis of this temperature change. The greater the increase in temperature and the more rapid the rate of increase in temperature, the larger will be the gas kick.

The most important fact for the drilling crew to known is that there is a gas kick, so that the crew can follow known procedures for protecting the integrity of the drilling operations. The existence of the gas kick can be deduced in this way. The next most important fact is knowledge of the size of the gas kick. This can be deduced on a subjective basis in accordance with the size and speed of the temperature rise, as mentioned above.

Example 2

Lost circulation is the opposite of gas kick, in that the formation pressure is lower than the wellbore pressure, with the result that the drilling fluid flows from the well bore into the formation. As with gas kick, the invention can be used to detect where lost circulation occurs, and to provide an estimate of the rate of flow of drilling fluid into the formation.

When the first temperature sensor 26 is in contact with the wall of the well bore, it detects the actual wall temperature. If the rate of lost circulation is significant, this temperature essentially will be the same as the drilling fluid temperature. The drilling fluid temperature is known in one of two ways: first, from measurements made with the first temperature sensor 26 as it passes through the drilling fluid as the arm 27 is being extended toward the bore wall; or second, from measurements made with the second sensor 37, if used, which always is positioned within the drilling fluid.

Thus, if the temperature measured by the first sensor 26 when in contact with the well bore is the same as the mud temperature, it may be deduced that the rate of flow of drilling fluids into the formation is significant.

Example 3

In examples 1 and 2, the discussion was based upon measurements made at a single point in the well. The value of these determinations is increased when the analysis is expanded to include th trend of the measurements over a greater portion of the well.

As the drilling operation proceeds through an extended length of formations that has little or no permeability, the basic analysis as related to the solution of equation (4) will be accurate. During this drilling interval, a good record of the true formation temperature as a function of depth will be obtained. The temperature is expected to change gradually with depth. The rate of change of temperature with depth (that is, the slope of the curve of temperature versus depth) also may change, either more or less continuously, or all at once when a new structural zone is entered. However, the total change in temperature from one measurement to the next is expected to be small, since measurements will be made at least once for every length of drill pipe. Thus, based upon the trend of previously measured values of the true formation temperature, it would be expected that, under normal circumstances, the value of the next measurement of true formation temperature could be predicted fairly accurately.

However, if the next measured value is much different from the predicted value, if the difference remains after a repeat measurement, and if mechanical factors are not the cause, it could then be deduced that a different physical situation has been encountered other than that of pure conduction as indicated by equation (4). Then, consistent with example 1 and 2, one of the following two situations may exist:

(1) If the true formation temperature calculated by equation (4) is lower than predicted and is the actually measured temperatures of the well bore wall are lower than previously measured and approach the temperature of the drilling fluid, then it may be deduced that this is a zone of lost circulation, and that the zone is relatively permeable and, thus, a potential producing zone; or (2) If the true formation temperature calculation by equation (4) is higher than predicted, and the actually measured temperature of the well bore wall are higher than previously measured and approach the value of the expected true formation temperature, then it may be deduced that this is a zone of gas kick, and that the zone is relatively permeable and, thus, a potential producing zone.

Example 4

The trend analysis described in example 3 can be extended to aid in the detection of over-pressured zones. The rate of change of temperature with respect to depth tends to increase in such zones. Thus, when measurements of the true formation temperature indicate a significant change of this type, the drilling crew can be warned to expect higher pressures. The crew then can taken the required steps to assure the safety of the operation.

Example 5

The permeability of a zone exhibiting gas kick or lost circulation can be estimated subjectively on the basis of the magnitude of the difference between the measured temperature and the expected temperature. Large differences imply high rates of cross flow, and, thus, high values for permeability.

As is clear from the preceding discussion, the apparatus and method of the invention permit the determination of reservoir properties in addition to the true formation temperature. Furthermore, from equation (7) it is shown how one such other property, related to the thermal diffusivity of the reservoir and represented by the variable (B) can be calculated.

The equations (1) and (4) for heat transfer by conduction apply only to the specific case in which the only mechanism of heat transfer between the well bore and the formation is that of conduction. The more complex equations that describe heat flow by both convection and conduction can be set up in place of equation (4), as was described subjectively in the examples of detecting occurrences of gas kick, lost circulation, and estimating the magnitude of these events.

The mechanism for quantitatively accounting for heat transfer by convection can be described by more general equations that those presented above. These more general equations can be evaluated in place of the equations that only account for the conductive heat transfer mechanism. Solutions to the broader equations will allow an extended analysis as follows:

1. When conduction is the only mechanism of heat transfer, the more general equations will reduce to the equations previously presented, and the true formation temperature will be determined as previously described.

2. When heat transfer by both conduction and convection occur at significant rates, the solution to the more general equations will give the true formation temperature as well as the value of the rate of cross flow. In contrast, under this circumstance equation (4) provides only the subjective information that conduction is not the only occurrence and provides a subjective measure of the existence and the amount of gas kick or lost circulation, as described in examples 1 and 2.

3. When heat transfer by convection is much more important than heat transfer by conduction, such as when gas kick or lost circulation are relatively large, the general equations will reduce, with sufficient accuracy, to a form that does not contain the conduction terms, but contains only convection terms. Then, the solution to the simplified convection equation by the method of the invention also will provide the value of true formation temperature.

In equation (4), the left hand side represents the change of temperature with time at a point within the formation. The right hand side represents the heat flux from one point to another within the formation due to conduction. Adding a second term to the right hand side can account for heat transfer by convection. One example of such a second term is: $v*(dT/dx)$, where $(v)$ represents the velocity of the fluid traveling through the formation, such as the velocity of the gas leaving the formation during an occurrence of gas kick. In this case, the velocity is constant over time and at all $(x)$ positions. Equation (4) then becomes:

$$dT/dt = a*(d^2T/dx^2) - v*(dT/dx) \qquad (9)$$

This equation can be solved and the solution matched with the boundary conditions of well bore wall temperatures as measured by the apparatus and method of the invention. Then, in a manner similar to that expressed by equations (6) and (7), where the true formation temperature and the variable (B) are calculated, this solution will lead to the value of the true formation temperature together with the value of (v).

When heat transfer by conduction is relatively small compared to heat transfer by convection, as when gas kick or lost circulation are relatively large, the above equation can be reduced to:

$$dT/dt = -v*(dT/dx) \qquad (10)$$

The solution to this equation is particularly useful in the case of gas kick, where a constant temperature will be measured over time at the wall of the well bore. This will be the true formation temperature.

Additional terms can be added to the equation to represent other complicating factors, including change in the velocity of cross flow with respect to time or position. The main hindrance to such complications is only the power of the computing system within the signal processing means that is used. In any such case, the method and apparatus of the invention are still applicable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

1. An apparatus for taking measurements while drilling an earth formation at the wall of a well bore and calculating therefrom by the laws of multidimensional and transient heat transfer by conduction a desired reservoir property, comprising:
   a temperature sensing means for measuring the temperature of the face of a well bore;
   a support means for carrying said temperature sensing means at a preselected depth in the well bore, substantially at the position of the earth formation to be measured;
   a locating means for positioning said temperature sensing means laterally of the support means at a proper position with respect to the bore wall for taking a temperature measurement of the face of the bore wall;
   an activating means for causing the temperature sensing means to register temperature readings of the face of the well bore over a predetermined period of elapsed time;
   a processing means for receiving the temperature readings of the well bore face from said temperature sensing means and calculating therefrom by the laws of multidimensional and transient heat transfer by conduction said desired reservoir property; and means for transmitting the readings of the temperature sensing means to said processing means.

2. The apparatus of claim 1, adapted to take measurements while drilling in a longitudinal well bore containing a drill pipe carrying a drill bit and having drilling fluid therein, wherein:
   said support means is connected to the drill pipe for at least longitudinal motion therewith;
   said temperature sensing means is carried in an area of the bore containing drilling fluid and measures the ambient temperature of the drilling fluid.

3. The apparatus of claim 2, wherein said processing means is carried by the drill pipe, and further comprising:
   a surface station; and
   a telemetry means for receiving the calculated desired reservoir property from said processing means and communicating the desired reservoir property to said surface station.

4. The apparatus of claim 2, wherein said support means comprises a collar connected to the drill pipe and carrying said temperature sensing means, and further comprising:
   an arm carried at a first end thereof by the collar and carrying said temperature sensing means on a second end thereof; and
   wherein said locating means moves the second end of the arm with respect to the collar for varying the radial distance from the collar of the temperature sensing means.

5. The apparatus of claim 2, wherein said support means comprises a collar connected to the drill pipe and carrying said temperature sensing means, and further comprising:
   an arm having first and second ends, carried at said first end thereof by the collar and carrying said temperature sensing means on the arm in a position between the first and second ends thereof; and
   wherein said locating means moves said second end of the arm with respect to the collar for varying the radial distance from the collar of the temperature sensing means.

6. The apparatus of claim 1, wherein said proper position of the temperature sensing means for taking a measurement of temperature of the bore wall is substantially in contact with the bore wall, further comprising:
   means for detecting when said temperature sensing means is in contact with the bore wall.

7. The apparatus of claim 6, wherein said detecting means comprises:
   a position sensor;
   a mounting means for connecting the position sensor to said temperature sensing means and for permitting the position sensor, in use, to move with respect to the mounting means in response to contact with a bore wall; and
   a means for sensing the relative movement between the position sensor and mounting means.

8. The apparatus of claim 7, wherein said position sensor comprises a plurality of probes spaced about said temperature sensing means.

9. The method of determining a reservoir parameter by taking measurements while drilling of an earth formation bordering a well bore, comprising:
   providing a support means for carrying a first temperature sensor;
   positioning said support means at a predetermined depth in a well bore;

providing a locating means for laterally positioning the first temperature sensor with respect to the support means;

actuating said locating means to laterally move the first temperature sensor to a position for taking a temperature measurement near the face of the well bore;

sensing the temperature near the face of the well bore with said first sensor by a plurality of temperature measurements spaced over time;

transmitting said plurality of temperature measurements to a processing means; and calculating the reservoir parameter by mathematically processing the plurality of temperature measurements by the laws of multidimensional and transient heat transfer.

10. The method of claim 9, further comprising:

after sensing the temperature near the face of the well bore, actuating said locating means to retract the first temperature sensor toward the support means.

11. The method of claim 9, wherein:

said first temperature sensor senses temperature on a substantially continuous basis;

the plurality of temperature measurements are transmitted to the processing means on a substantially continuous, real time basis; and the processing means determines a time line over which the temperature readings were taken.

12. The method of claim 9, for taking measurements while drilling, wherein said support means comprises a drilling collar and said step of positioning the support means comprises:

mounting said collar in a drill string having a bit at the lower end thereof; and forming a well bore by operating said bit and lowering the bit and collar below the wellhead and into the well bore.

13. The method of claim 12, wherein said bit is operated by rotation, and the step of actuating the location means comprises:

providing a centrifugal switch in operative communication with said location means and responsive to cessation of rotation of the bit; and actuating the location means to extend the first temperature sensor by operation of the centrifugal switch in response to cessation of rotation of the bit.

14. The method of claim 12, wherein a drilling fluid is circulated through the well bore during said forming step, and further comprising: continuing to circulate the drilling fluid during said sensing step.

15. The method of claim 9, wherein said plurality of temperature measurements are taken at a predetermined time interval.

16. The method of claim 15, wherein said plurality of temperature measurements are taken over a range of less then thirty seconds between successive readings.

17. The method of claim 15, wherein said plurality of temperature measurements are made over a period of less than 200 seconds.

18. The method of claim 9, wherein said locating means moves the first temperature sensor from a retracted position into an extended position spaced from the bore face for taking temperature measurements of drilling fluid near but spaced from the bore face; and after said step of actuating the locating means and before the step of sensing the temperature, further comprising:

detecting the proximity of said first sensor to the face of the well bore.

19. The method of claim 18, wherein said detecting step comprises:

taking a series of preliminary temperature measurements over time with said first sensor while the sensor is less than fully laterally extended;

transmitting said preliminary temperature measurements to a processing means; and analyzing the preliminary temperature measurements for change over time.

20. The method of claim 18, wherein said detecting step comprises:

providing a position sensor sensitive to progressive contact in the direction of lateral extension of said first temperature sensor, extending in advance of the first temperature sensor and detecting approach to the well bore face.

* * * * *